Feb. 8, 1944.  S. MYERSON  2,341,153

TOOTH HOLDER

Filed Jan. 9, 1940

Inventor
Simon Myerson
By Roberts Cushman Woodberry
Att'ys.

Patented Feb. 8, 1944

2,341,153

UNITED STATES PATENT OFFICE 2,341,153

TOOTH HOLDER

Simon Myerson, Brookline, Mass.

Application January 9, 1940, Serial No. 313,077

4 Claims. (Cl. 32—71)

This invention pertains in general to holders for artificial teeth, in particular to an appliance comprising means operative temporarily and removably to hold a plurality of artificial teeth so disposed as to simulate natural teeth socketed in the gum, or to simulate teeth permanently mounted in a denture. One object of the invention is to provide an improved holder useful for holding a plurality of teeth, for example six anterior teeth, in proper relative position during shipment and in such a way as to display the teeth to great advantage. Another object of the invention is to provide a holder which is useful in observing the group effect of a plurality of artificial teeth as they would appear in the patient's mouth but before the teeth are permanently fixed in a denture, and including means providing tooth holding sockets for the reception of the gingival portions of the teeth, and gum-simulating means in juxtaposition to the sockets. The invention has for another object the provision of a holder operative temporarily to hold a tooth or teeth in place in a patient's mouth so that the dentist and patient may observe them in the mouth and thus obtain an accurate idea as to how the denture will appear when completed.

Other and further objects and advantages of the invention will be made manifest in the following more detailed description and by reference to the accompanying drawing, in which Fig. 1 is a front elevation of a holder embodying the present invention, showing six anterior teeth mounted thereon;

Figure 1:
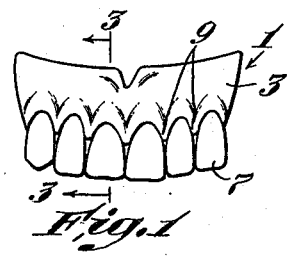
Figure 3:
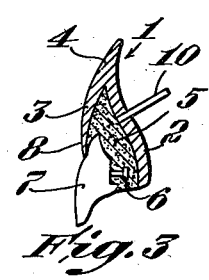
Fig. 3 is a section on the line 3—3 of Fig. 1.
Figure 4:
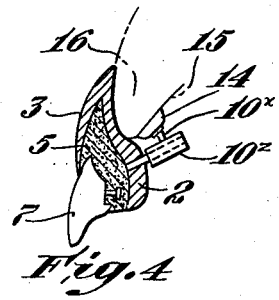
Fig. 4 is a section similar to Fig. 3 showing a holder of slightly modified construction temporarily secured in position in the mouth.
Figure 2:
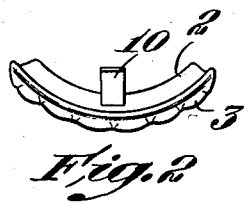
Fig. 2 is a plan view of the holder of Fig. 1.
Figure 5:
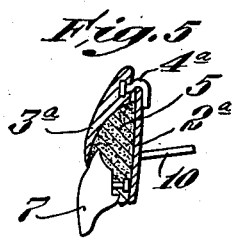
Figure 9:
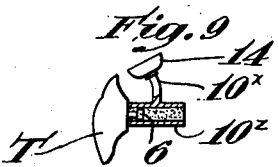
Figure 6:
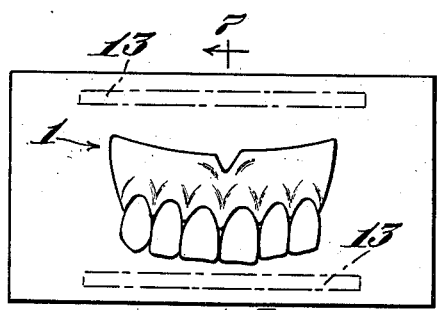
Figure 7:
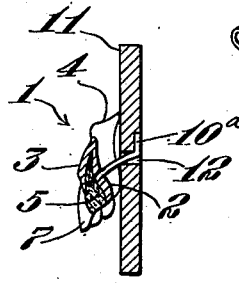
Figure 8:
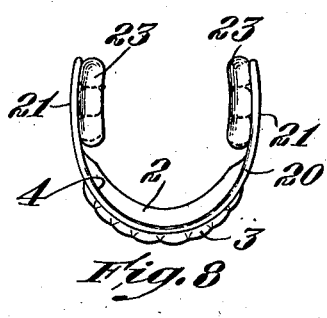
Figure 10:
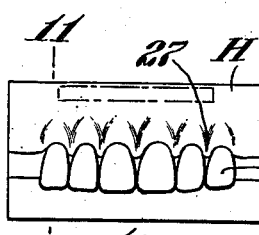
Figures 11, 12:

Fig. 4ᵃ is a perspective view, to large scale, showing details of the holder support illustrated in Fig. 4;

Fig. 5 is a section similar to Fig. 3, but illustrating a modified form of holder;

Fig. 6 is a front elevation illustrating the holder of Fig. 1 mounted upon a card for shipping or display purposes;

Fig. 7 is a section on the line 7—7 of Fig. 6;

Fig. 8 is a plan view of a holder of modified construction;

Fig. 9 is a side elevation, partly in vertical section, showing a support substantially like that of Fig. 4ᵃ arranged so as itself to constitute a holder for temporarily positioning a single tooth in the mouth;

Fig. 10 is a front elevation of a holder which, in a unitary structure, embodies a holder for a series of teeth, whereby they may be so displayed as to afford a natural effect, and also constituting a card for use in supporting the teeth during shipment;

Fig. 11 is a section on line 11—11 of Fig. 10; and

Fig. 12 is a view similar to Fig. 11 but with the tooth removed.

Referring to the drawing (Figs. 1-4) the numeral 1 designates a preferred form of holder embodying the present invention, such holder (Fig. 3) comprising a rear or supporting member 2, a front or anterior gum-simulating member or apron formed by an anterior wall 3, and an upper portion 4 with which the parts 2 and 3 are integrally joined and from which they diverge downwardly so as to provide between them an elongate substantially horizontal groove chamber or socket designed to receive a body 5 of dental wax (usually thermoplastic) adhesive or means capable of removably holding the teeth by means of their gingival portions assisted by their attaching pins 6. Preferably, the wax should be of a color such as to simulate the gum. While such a body 5 of wax or plastic adhesive is desirable, it is contemplated that other and equivalent attachment for removably securing the teeth to the support 2 may be provided, all within the scope of the invention.

Preferably the parts 2, 3 and 4 are made integral from a mouldable material, for example one of the synthetic resins, among which those derived from methacrylic acid have been found particularly desirable for dental work. However, other materials suitable for the purpose may be employed, for instance gutta-percha or metal coated with enamel. The anterior gum-simulating wall or apron 3 is suitably colored, either by coloring the material of which it is made, or by the use of suitably colored surface coatings so as to simulate the gum tissue which overlies the jaw bone and which to some extent overlaps and partially envelopes the necks of natural teeth which are posterior to the wall 3. As here illustrated the holder 1 temporarily supports six anterior upper teeth 7, the gingival portion and the attaching pins 6 of these teeth being embedded in the wax 5 in the groove, chamber or socket between the parts 2 and 3. The lower edge portion 8 of the gum-simulating part 3 of the holder is tapered downwardly and its edge is so shaped (comprising a series of arcuate recesses) as to overlap and conceal the gingival ends of the teeth which are posterior to the wall 3 and to include cusplike portions 9 which partially surround the neck portions of the teeth.

The rear member or support 2 is preferably provided with an attaching element 10, for instance a lug, boss or pin, flexible tab or the like, by means of which the holder may be held and by means of which it may conveniently be attached to a suitable support, or mounted upon a display card 11 (Fig. 6) of the general type employed for mounting a series of teeth for shipment and for display. This card 11 may be of substantially rectangular contour as illustrated in Fig. 6 and of an appropriate thickness to form a firm, rigid and protective support for the tooth holder, and is provided with a slot 12 or the like through which the tab 10 may be passed. Preferably the tab is pliable so that it may be bent over at the rear side of the card as shown at 10ª for retaining the holder in place. The card may be provided as diagrammatically indicated at 13, with printed matter, for instance to indicate the maker of the teeth or the trade name under which the teeth are sold.

The holder with its complement of teeth will be mounted upon the card and in this form shipped to the dentist, the card furnishing substantial protection, by reason of its rigidity, and also acting as a support by means of which the holder 1 with its teeth may be set up in desired position for observation or for display.

For temporarily supporting the holder with its complement of teeth in the patient's mouth for observation, a support or bracket device such as illustrated in Figs. 4 and 4ª may be employed.

This support or bracket member 10ˣ is provided at its upper end with a suction cup 14 designed to engage an inner surface of the mouth, for instance the lingual surface 15 of the gum ridge 16, so as temporarily to position the support within the patient's mouth. The lower part of the support or bracket member 10ª is provided with means, for instance the sleeve 10ᶻ, designed to receive the tab 10 of the holder and thus to attach the holder to the support. As shown, the sleeve 10ᶻ has a vertically narrow passage or bore such that a flat sheet metal tab 10 may fit snugly therein with possibility of longitudinal adjustment. When the holder is thus mounted on the support 10ˣ the teeth 7 are exposed in substantially the same position which they would occupy if permanently mounted in a denture, and in this way the dentist and the patient may determine beforehand the expected appearance of the completed denture, thus making it convenient to exchange the teeth 7 for another set before they are permanently mounted, and to furnish an accurate idea as to how they will finally look before using them.

While a holder formed as an integral element, as illustrated in Figs. 1 to 4 is desirable, it is contemplated that the holder may be made of several separable parts, as indicated for example in Fig. 5. In this view the front or gum-simulating member 3ª may be a part moulded from plastic material of any of the kinds above suggested, or other equivalent substances, while the rear or supporting member 2ª is of sheet metal or the like, the parts 2ª and 3ª being united at their upper edges by means of clips 4ª or the like, here shown as carried by the front member and having hook portions, resilient if desired, which engage over the upper edge of the part 2ª or which otherwise removably unite the part 3ª to the part 2ª. The parts 2ª and 3ª diverge from their adjacent upper edges to form a chamber for the reception of the tooth attachment, that is to say the body 5 of wax or the like, in which the gingival ends and pins of the teeth 7 are temporarily mounted.

It should be noted as respects all of the several forms of holder thus far described that the parts 2 and 3 or 2ª and 3ª, respectively, are curved in horizontal section (Fig. 2) so as more or less to conform to the curvature of the human jaw so that when the holder is placed in the mouth the rear surface of the part 2 will snugly engage the labial surface of the gum ridge.

In this connection it is considered as within the bounds of the invention to make the holder, comprising the parts 2, 3 and 4, of a material which is somewhat pliable, at least when warmed, so that it may be conformed accurately to the gum ridge of any patient's mouth merely by softening it and bending it between the fingers.

While the holder as thus far described is particularly designed for holding a plurality of teeth, it is contemplated that in its broader aspects the invention is inclusive of holders designed temporarily to hold a single tooth in the patient's mouth for observation. Thus as illustrated in Fig. 9, the single tooth T is mounted directly upon a support or bracket 10ˣ such as illustrated in Figs. 4 and 4ª, but with the sleeve portion 10ᶻ of the support filled with wax into which the pin or pins 6 of the tooth may be thrust so as removably to connect the tooth and sleeve, the latter, itself, then constituting the holder for the single tooth. By making the support on bracket 10ˣ of flexible material, it may be so bent that the suction cup may be disposed so as properly to engage any desired portion of the interior surface of the patient's mouth.

In Fig. 3 a further modification is illustrated wherein the holder, which in general may correspond in construction to that of Figs. 1 to 4, is provided with a metal frame 20 which may be embedded in the part 4 of the holder, or otherwise secured thereto and which has narrow extensions 21 reaching toward the molar regions of the mouth. As illustrated, these extensions are provided with elongate suction cups 23 designed to engage the interior surface of the mouth in the molar region. If desired, the extensions 21 may be provided with means for supporting molars and bicuspids, so as thereby to permit the temporary mounting of a full set in the patient's mouth. The holder of Fig. 8 may also be provided with a bracket such as the bracket 10ˣ of Fig. 9 at the anterior portion, thereby providing a three-point suspension for the holder within the mouth.

While the holders hereinabove described and illustrated are indicated as for removably holding upper teeth, it is obvious that by slight modification in shape, but without substantial change in structure, such holders may be made available for use in holding removably lower teeth in position for observation.

The device as thus described is advantageous as compared with the usual tooth display card in that it supports a plurality of teeth in relative position more closely simulating that of natural teeth in the mouth than does the usual flat card. Further, it enables the dentist temporarily to position several teeth at the same time within the patient's mouth, which is highly advantageous as compared with the usual practice of taking an individual tooth in a holder and holding it for observation in the patient's mouth. It has a further advantage in that the teeth, as supported by this holder, are not in any way obscured by the dentist's hand or by any implement for holding them while in position for observation, and moreover permits them, while so held in the patient's mouth, to be observed from a substantial distance which is not possible under usual methods. Furthermore, the patient may himself observe them readily, and as they are stationary while being observed, a much better and more natural effect is obtainable than when the tooth is merely held in a suitable holder in the dentist's hand. The present arrangement is also highly advantageous, as compared with the usual method of mounting teeth on a wax biteblock or a bite-block of any other compound since the making of such bite-blocks and the mounting of teeth therein involves the preparation of impressions, pouring of models and much other work, whereas the arrangement of Figs. 1 and 8, with its curved holder, closely conforming to the contour of the gum ridge, enables the teeth to be put in position and held without external assistance in the proper position for observation and for comparison with the appearance of the patient's natural teeth and the quick interchange or removal of individual teeth in trying for the most pleasing effect without any such slow and laborious preliminary operations as have usually been necessary in order to obtain a clear idea as to the appearance of the proposed completed denture.

The somewhat simpler holder H of Figs. 10, 11, and 12 provides for temporarily supporting a plurality of teeth in a manner such as in a general way to simulate the appearance of teeth mounted in a denture or natural gum, and at the same time provides a practical display and shipping card. In this arrangement the holder H takes the form of a card-like element of any appropriate material. For example, it may be of moulded synthetic resin or other plastic, or of sheet metal, cardboard or the like. This cardlike element comprises the back or supporting portion 25 having in its front face a horizontal elongate groove 26 (or a series of separate cavities, if preferred) providing a socket chamber designed to receive a body of wax 5ˣ. The front gum-simulating portion or apron 27 of the cardlike element which is located just above the groove 26 extends downwardly so as to overhang the groove, and is desirably colored to simulate natural gum tissue and has its lower edge indented. This front part 27 is designed to overlap the gingival portions of teeth 7 (having their retaining pins embedded in the wax 5ˣ in the socket chamber), the indented edge of the part 27 partially surrounding the neck portions of the teeth so that the teeth thus mounted in the holder exhibit much the same appearance as when permanently fixed in a denture, except that they are all in substantially the same plane.

Preferably the front surface of that portion of the card-like element which lies immediately below the groove is of a dark color, for example dark gray or black, thereby to simulate the darkness of the oral cavity and thus to impart to the incisal portions of the teeth mounted on the holder an appearance similar to that which might be expected were they actually in place in the mouth.

While certain desirable embodiments of the invention have herein been illustrated by way of example, it is to be understood that the invention is not necessarily limited to these precise embodiments but is to be regarded as broadly inclusive of any and all equivalent constructions which fall within the scope of the appended claims.

I claim:

1. As a new article of manufacture, a display holder adapted to receive artificial teeth for individual adjustment and removal manually, said holder being substantially rigid and comprising an anterior gum simulating portion, said gum simulating portion having an anterior wall, means on said holder serving to secure individual teeth to the holder with the necks of the teeth posterior to the lower margin of said anterior wall for manual individual adjustment, removal and replacement without injuring the holder.

2. As a new article of manufacture, a display holder adapted to receive artificial teeth for individual adjustment, removal and replacement manually, said holder being substantially rigid and comprising an anterior gum simulating portion, said gum simulating portion having an anterior wall, means on said holder serving to secure individual teeth to the holder with the necks of the teeth posterior to the lower margin of said anterior wall for manual individual adjustment, removal and replacement without injuring the holder, said securing means including a plastic material on said holder which softens under heat at a lower temperature than the material of the holder.

3. As a new article of manufacture, a display holder adapted to receive artificial teeth for individual adjustment, removal and replacement manually, said holder being substantially rigid, the holder comprising an anterior gum simulating portion having an anterior wall, the holder having a cavity posterior to the lower margin of the wall, the wall having cusp portions adapted to substantially surround the neck portions of the teeth disposed in the cavity, means on said holder serving to secure individual teeth to the holder with the necks of the teeth posterior to the lower margin of said anterior wall and within said cavity for manual, individual adjustment, removal and replacement without injuring the holder, said securing means including a plastic material on said holder which softens under heat at a lower temperature than the material of the holder whereby teeth may be readily adjusted, removed or replaced without injuring the holder.

4. As a new article of manufacture, a display holder adapted to receive artificial teeth for individual adjustment, removal and replacement manually, said holder being substantially rigid, the holder comprising an anterior gum simulating portion having an anterior wall, the holder having a cavity posterior to the lower margin of the wall, the wall having cusp portions adapted to substantially surround the neck portions of the teeth disposed in the cavity, means on said holder serving to secure individual teeth to the holder with the necks of the teeth posterior to the lower margin of said anterior wall and within said cavity for manual, individual adjustment, removal and replacement without injuring the holder, said holder having on its rear surface below its upper edge a supporting projection adapted to serve as a support for the holder either within the mouth or upon a supporting card.

SIMON MYERSON.